United States Patent [19]

Bi

[11] 4,371,670
[45] Feb. 1, 1983

[54] COPOLYMERS HAVING A BACKBONE OF ALTERNATING POLYMER BLOCKS AND SILICON UNITS

[75] Inventor: Le-Khac Bi, West Chester, Pa.

[73] Assignee: Atlantic Richfield Company, Los Angeles, Calif.

[21] Appl. No.: 238,297

[22] Filed: Feb. 26, 1981

[51] Int. Cl.³ .............................................. C08L 83/00
[52] U.S. Cl. .................................................... 525/342
[58] Field of Search ......................................... 525/342

[56] References Cited

U.S. PATENT DOCUMENTS 3,244,664  4/1966  Zelinski ................................ 525/342
3,647,740  3/1972  Toree et al. ............................ 528/42
4,304,886  12/1981  Bean, Jr. et al. ..................... 525/342

FOREIGN PATENT DOCUMENTS 2251567  6/1975  France .
2367098  5/1978  France .
46-18493  5/1971  Japan ................................... 525/342

*Primary Examiner*—William F. Hamrock
*Assistant Examiner*—Peter F. Kulkosky
*Attorney, Agent, or Firm*—Dennis M. Kozak

[57] ABSTRACT

Copolymers having a backbone of alternating polymer block and silicon units are described. The copolymers exhibit fire retardant properties.

9 Claims, No Drawings

COPOLYMERS HAVING A BACKBONE OF ALTERNATING POLYMER BLOCKS AND SILICON UNITS

This invention relates to silicon-containing copolymers.

More specifically, this invention relates to alternate copolymers produced by introducing silicon units into polymer backbones. The resulting copolymers exhibit fire retardancy.

Industry is continually searching for ways to impart fire retardant properties to polymers such as polystyrene. The present invention furthers this search by providing a novel fire retardant copolymer.

According to this invention there is provided an alternating copolymer having the formula $$-\!\!\!\left[\!\left(W\right)_{\!n}\!\!\begin{array}{c}R\\|\\Si\\|\\R\end{array}\!\right]_{\!m}\!\!-$$

wherein each R separately represents hydrogen, a ($C_1$ to $C_4$) alkyl group or a phenyl group; W represents at least one monomer selected from the group consisting of dienes, styrenes, vinylidene chloride, vinyl esters, acrylic and methacrylic esters and acrylonitrile; n represents an integer from 2 to 300; and, m represents an integer from 2 to 50.

Also according to this invention, there is provided a method for producing the above-described copolymer which method comprises forming a living polymer dianion by anionic polymerization of a monomer using a difunctional organometallic initiator and reacting the living polymer dianion with a silicon compound of the formula $$Y-\!\!\begin{array}{c}R\\|\\Si\\|\\R\end{array}\!\!-Y$$

wherein R is as defined above and each Y separately represents halogen.

Representative of the above silicon compounds and found suitable for use are methyldichlorosilane, dimethyldichlorosilane, diethyldichlorosilane, methylphenyldichlorosilane ethylphenyldichlorosilane, diphenyldichlorosilane and the like.

The living polymer dianion can be prepared using any suitable difunctional organometallic initiator. Suitable initiators are well known and include the difunctional lithium catalysts designated "DiLi" by Lithium Corporation of America, lithium-napthalene initiators and a difunctional organopotassium initiators. The initiator employed in the examples of this invention was the dipotassium salt of α-methyl styrene tetramer having the formula:

$$K^{\oplus\ominus}\!\!\begin{array}{c}CH_3\\|\\C\\|\\Ph\end{array}\!\!-CH_2-\!\!\begin{array}{c}CH_3\\|\\C\\|\\Ph\end{array}\!\!-CH_2-CH_2-\!\!\begin{array}{c}CH_3\\|\\C\\|\\Ph\end{array}\!\!-CH_2-\!\!\begin{array}{c}CH_3\\|\\C^{\ominus}K^{\oplus}\\|\\Ph\end{array}.$$

In the preparation of the alternating copolymers of this invention any monomer (W) or monomer mixture which can be anionically polymerized is suitable for use. Monomers which can be anionically polymerized are dienes, styrenes, vinylidene chloride, vinyl esters, acrylic and methacrylic esters and acrylonitrile. As used herein, the term "styrenes" is understood to mean styrene, styrenes which are alkylated in the side chain such as α-methyl styrene and nuclear-substituted styrenes such as vinyl toluene and ethylvinyl benzene.

Styrenes are the preferred monomers and styrene was employed in the examples of this invention.

The polymerization is conducted in any suitable inert hydrocarbon or polar solvent such as cyclohexane, tetrahydrofuran, toluene, mixtures thereof and the like. The polymerization is carried out in the absence of oxygen, moisture and any other impurity which is detrimental to anionic catalyst systems. The temperature of polymerization may be from about −50° to about 120° C., depending upon the solvent employed.

Having described the materials suitable for use in this invention, reference is now made to the following examples.

EXAMPLE I

This example demonstrates the preparation of a copolymer of this invention.

A one gallon stirred reactor was charged with about 2500 ml of cyclohexane and about 150 grams of styrene at a temperature of about 70° C.

The reactor contents were sterilized by titrating with sec-butyllithium until a red color appeared.

About 48.4 ml of a 0.62N dipotassium initiator, having the formula shown above were charged into the reactor. The polymerization was completed in about 30 minutes.

About 5.3 grams of dimethyldichlorosilane were added to the reactor and the temperature of the reactor was maintained at about 70° C. for about one hour.

The resulting copolymer was precipitated by adding methanol under high speed stirring. The wet copolymer was filtered, washed with methanol and dried under vacuum.

The resulting copolymer was found to have a number average molecular weight range of from about 32,000 to about 65,000 as measured by a gel permeation chromatograph (GPC) using polystryene standards and found to have an oxygen index of 21. The oxygen index was tested using the procedure entitled "Oxygen Index of Liquids" by Nelson and Webb, Journal of Fire and Flamability, Volume 4, p. 210, 1973. The test procedure is taught to be suitable for use on fusible solids as well as liquids.

EXAMPLE II

This example demonstrates the preparation of a copolymer of this invention.

A one gallon stirred reactor was charged with about 2500 ml of cyclohexane and about 150 grams of styrene at a temperature of about 70° C.

The reactor contents were sterilized by titrating with sec-butyllithium until a red color appeared.

About 48.4 ml of a 0.62N dipotassium initiator, having the formula shown above, were charged into the reactor. The polymerization was completed in about 30 minutes.

About 2 grams of dimethyldichlorosilane were charged to the reactor, the temperature of the reactor was maintained at about 70° C. and the reactor contents stirred overnight and then an additional 2 grams of dimethyldichlorosilane were added.

The resulting copolymer was precipitated by adding methanol under high speed stirring. The wet copolymer was filtered, washed with methanol and dried under vacuum.

The resulting copolymer was tested by GPC and found to have a number average molecular weight range of from about 35,000 to about 70,000 and oxygen index of 21 tested using the above-mentioned procedure.

It is apparent from the foregoing that the copolymers of this invention provide fire retardancy. As such they serve to provide fire retardancy when manufactured into various forms such as films, molded articles, coatings, fibers and the like and when incorporated as an additive into polymers such as, for example, polystryrene.

It will be evident from the foregoing that various modifications can be made to the present invention. Such, however, are considered as being within the scope of the invention.

What is claimed is:

1. An alternating copolymer having the formula

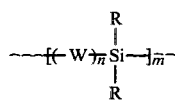

wherein each R separately represents hydrogen, a ($C_1$ to $C_4$) alkyl group or a phenyl group; W represents at least one monomer selected from the group consisting of dienes, styrenes, vinylidene chloride, vinyl esters, acrylic and methacrylic esters and acrylonitrile; n represents an integer from 2 to 300; and, m represents an integer from 2 to 50 and wherein said copolymer is solid.

2. The alternating copolymer of claim 1 in which W is styrene and each R represents methyl and wherein said copolymer is a solid.

3. A method for producing a copolymer having the formula:

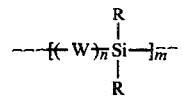

which comprises forming a living polymer dianion by anionic polymerization of said monomer using a difunctional organo-metallic initiator and reacting the living polymer dianion with a silicon compound of the formula

wherein R is defined above and each Y separately represents halogen and wherein said copolymer is a solid.

4. The alternating copolymer is claim 1 in the form of a film.

5. The alternating copolymer of claim 1 in the form of a molded article.

6. The alternating copolymer of claim 1 in the form of a fiber.

7. The alternating copolymer of claim 1 in the form of a coating.

8. A polymer blend comprising the alternating copolymer of claim 1.

9. A fire retardant additive for polymers consisting essentially of the alternating copolymer of claim 1.

* * * * *